Patented Oct. 3, 1939

2,174,619

UNITED STATES PATENT OFFICE 2,174,619

POLYAMIDES

Wallace Hume Carothers, Wilmington, Del., assignor to E. I. du Pont de Nemours & Company, Wilmington, Del., a corporation of Delaware No Drawing. Application September 22, 1936, Serial No. 102,053

13 Claims. (Cl. 260—78)

This invention relates to polymeric materials, and more particularly to new polyamides.

In my applications Serial Numbers 180 and 181, filed January 2, 1935, now Patents Nos. 2,071,253 and 2,130,523, I have disclosed polyamides which are capable of being drawn into strong fibers showing upon X-ray examination typical fiber orientation along the fiber axis. The polyamides most useful for this purpose are those in which the chain of atoms constituting the recurring structural unit contains either no unsaturated carbon to carbon linkages, or contains unsaturation of the benzenoid type only. Thus, polyamides derived from amino acids of formula $NH_2RCOOH$ and from diamines of formula $NH_2R'NH_2$ plus dicarboxylic acids of formula $HOOCR''COOH$, in which R, R' and R'' are divalent hydrocarbon radicals free from non-benzenoid unsaturation, are for the most part high-melting crystalline solids which can be obtained in the form of superpolyamides, that is, products which can be spun into filaments that can be cold-drawn into oriented fibers. These superpolyamides are generally insoluble in most organic solvents with the exception of phenols and certain acids.

I have now found that the polyamides containing unsaturated carbon to carbon linkages of the non-benzenoid type, although less useful in the production of fibers, possess properties such as solubility in conventional organic solvents which make them useful for various purposes to which the fiber-forming polyamides claimed in the above mentioned applications are not adapted. The present invention is concerned with these unsaturated polyamides.

This invention has as an object the preparation of new and useful polymeric products. A further object is the production of polyamides which are useful in the coating and in other arts. Other objects will appear hereinafter.

The polyamide-forming reactants, as described in the above mentioned cases, are substances which on heating alone or in admixture with another reactant (complementary polyamide-forming reactant) are capable of yielding a polyamide. These substances include polymerizable monoaminomonocarboxylic acids, amide-forming derivatives of polymerizable monoaminomonocarboxylic acids, diamines, dicarboxylic acids, and amide-forming derivatives of dibasic carboxylic ocids. In the preparation of polyamides, a diamine requires as a complementary polyamide-forming reactant a dicarboxylic acid or amide-forming derivative thereof, while a dicarboxylic acid or its derivatives requires a diamine as a complementary polyamide-forming reactant. In the specification and claims the term "dibasic carboxylic acid" will be used to include dicarboxylic acids and amide-forming derivatives of dibasic carboxylic acis. The term "amide-forming derivatives" will be used to cover esters, anhydrides, amides, and acid halides.

In the present invention the polyamide-forming reactants, as for instance a polymerizable monoaminomonocarboxylic acid, contain an unsaturated linkage of the non-benzenoid type. Or if two reactants are used, as in the case of diamines and dibasic carboxylic acids, at least one of the reactants must contain such unsaturation. The term "non-benzenoid unsaturation" refers to aliphatic unsaturation, namely, olefinic or acetylenic unsaturation, as distinguished from the unsaturation contained in the benzene ring of aromatic compounds. However, the unsaturation remaining in a benzene ring which has lost its aromatic character by elimination (hydrogenation) of one or more of its pairs of double bonds is non-benzenoid unsaturation.

The polyamides of this invention may be derived from unsaturated amino acids, the unsaturation preferably being present in the chain of atoms separating the amino and carboxyl groups rather than in the branch or side chain. The most valuable polyamides of this invention, however, are made by reacting a diamine with a dibasic carboxylic acid containing non-benzenoid unsaturation, or by reacting a dibasic carboxylic acid with a diamine containing such unsaturation, or by reacting a diamine and a dibasic carboxylic acid both of which contain non-benzenoid unsaturation. It must be observed, however, that the amino groups of the diamine must be attached to aliphatic carbon atoms because infusible and non-resinous products generally result if diamines are used in which the amino groups are attached directly to aromatic carbon atoms. Moreover, only primary and secondary diamines, i. e., diamines whose amino nitrogens each carry at least one hydrogen atom, can be used.

As a general method of carrying out my invention an unsaturated polymerizable monoaminomonocarboxylic acid (including amide-forming derivatives thereof) or a mixture of substantially chemical equivalent amounts of a primary or secondary diamine and a dibasic carboxylic acid, at least one of which contains an unsaturated non-benzenoid linkage, are heated in the presence or absence of a solvent to reaction temperature, which is usually 100–300° C., and preferably 150–275° C., until a polymer of the desired properties is formed. The reaction may also be carried out in the presence of a diluent which is a non-solvent for the polymer. The reaction is a condensation polymerization involving the removal of the by-product water, alcohol, phenol, hydrogen chloride, or ammonia, depending upon the derivatives of the said acid used. The heating may be carried out in an open or closed reactor under ordinary, reduced, or increased pressure. Usually it is desirable to carry out the reaction under conditions which permit the removal of the water or other by-products formed in the reaction. It is desirable to carry out the reaction in the absence of air, and it is sometimes advantageous to add an antioxidant. Generally it is unnecessary to add a catalyst; although inorganic substances of alkaline reaction, such as oxides and carbonates, and acid substances such as halogen salts of polyvalent elements, e. g., aluminum, zinc, and tin, are sometimes helpful.

When the polyamide is prepared from a diamine and a dibasic carboxylic acid, the first reaction which occurs on bringing the reactants into sufficiently intimate contact is the formation of a diamine-dicarboxylic acid salt. It is often desirable to separate and purify this salt prior to its conversion into the polyamide. The salts are generally crystalline, are readily purified by crystallization from a suitable solvent, such as water or alcohol, and have definite compositions. The preparation of the salts affords an automatic means of adjusting the amine and acid reactants to substantial equivalency and avoids the difficulties attendant upon the preservation of the isolated amine in the state of purity. The formation and purification of the salts also tends to eliminate impurities present in the original diamine and dibasic acid.

The polyamides of this invention as initially prepared contain unsaturated linkages of the non-benzenoid type, that is, an olefinic or acetylenic linkage. This unsaturated linkage appears in the divalent hydrocarbon radicals separating the recurring amido groups in the polymer molecules. The position of the unsaturated linkage and the order and frequency of its occurrence in the polymer molecule are dependent upon the reactants used in the preparation of the polymer. If the polymer is obtained exclusively from a polymerizable monoaminomonocarboxylic acid, NH₂RCOOH, in which R is a divalent hydrocarbon radical containing an unsaturated linkage of the non-benzenoid type, then this unsaturated linkage will be present in each recurring unit (—NHRCO—) in the polyamide. If the polymer is derived from a mixture of saturated and unsaturated polymerizable amino acids, the unsaturated linkage will of course appear less frequently in the polymer molecule. It is evident that several types of unsaturated polyamides of the diamine-dibasic acid type can be prepared; for example, those in which the diamine (NH₂R'NH₂) represented is unsaturated, those in which the dibasic carboxylic acid (HOOCR"COOH) is unsaturated and those in which both the amine and acid are unsaturated. In the formulae R' and R" represent divalent hydrocarbon radicals one or both of which contains an unsaturated linkage of the non-benzenoid type. The unit length of the recurring units of the resulting polyamide is the sum of the radical lengths of the diamine and the dibasic carboxylic acid used in its preparation. Thus, the unit length of the polyamide given in the first example below is 16 since it is made from fumaric acid and decamethylenediamine, whose radical lengths are 4 and 12, respectively. The recurring structural unit of this unsaturated polyamide may be represented as follows:

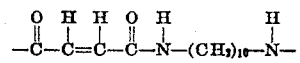

In order to obtain polyamides of good fusibility and solubility by the process of this invention it is necessary to select reactants such that the sum of their radical lengths is at least 9. Polyamides of unit length less than 9 are in general too insoluble and/or infusible to be useful in coating compositions or the like.

My new polyamides whether made by polymerization of amino acids where the reacting groups are the amino and carboxyl groups of different molecules and the product has the recurring unit

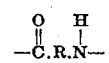

or whether the polyamide results from the interaction of the amino groups of a diamine with the carboxyl groups of a dibasic carboxylic acid and the product has the recurring unit

are all characterized by the fact that the structural unit of the polyamide consists of a chain of atoms having an unsaturated (olefinic or acetylenic) divalent hydrocarbon radical situated between a nitrogen atom attached to aliphatic carbon and a carbonyl group. In other words, my polyamides comprise the reaction product of one or more reactants which provide interacting amide-forming carboxyl and amino groups, said amino groups being attached to aliphatic carbon atoms and having at least one hydrogen atom attached to each nitrogen atom, the amide-forming groups in at least one of said reactants being separated by an intermediate hydrocarbon radical containing an unsaturated carbon-carbon non-benzenoid linkage.

Still further combinations are possible by using saturated diamines and dibasic carboxylic acids along with the unsaturated diamine and/or unsaturated dibasic carboxylic acid. It is also possible to use polymerizable monoaminomonocarboxylic acids in conjunction with a diamine and a dibasic carboxylic acid, at least one of said reactants being unsaturated. It is evident therefore that at least one of the reactants used in the preparation of the products of this invention must have the formula XRY in which X and Y represent amino or carboxyl groups (or their equivalents) and R represents a divalent hydrocarbon radical containing an unsaturated non-benzenoid linkage. On hydrolysis with strong mineral acids the products of this invention in general yield the reactants from which they were derived, the amino constituents being obtained in the form of their mineral acid salts.

The following examples, in which parts are given by weight, are illustrative of the preparation and application of the products of this invention:

EXAMPLE I

*Polyamide from fumaric acid and decamethylenediamine*

Eleven and six-tenths (11.6) parts of fumaric acid was heated with 18 parts of decamethylenediamine and 30 parts of phenol for 30 minutes at 150–160° C. and then for 20 minutes at 150–160° C. under 1–2 mm. absolute pressure to remove the phenol. A light-colored, friable resin was obtained which melted at 45–50° C. This product could be transformed into an infusible and insoluble resin by heat treatment, possibly as a result of polymerization through the unsaturated olefinic linkages.

Example II

*Polyamide from maleic acid and decamethylenediamine*

Eleven and six-tenths (11.6) parts of maleic acid was heated with 18 parts of decamethylenediamine and 30 parts of phenol for 50 minutes at 150–160° C.; during the last 20 minutes of heating the pressure was reduced to 2 mm. and the phenol distilled. An amber-colored, elastic, heat-hardenable product was obtained which slowly hardened upon standing at room temperature.

Example III

*Polyamide from acetylenedicarboxylic acid and decamethylenediamine*

Eleven and four-tenths (11.4) parts of acetylene dicarboxylic acid was dissolved in 50 parts of ethanol and added to a solution of 18 parts of decamethylenediamine in 50 parts of ethanol. The solution was allowed to stand overnight to complete crystallization of the acetylenedicarboxylic acid-decamethylenediamine salt. The yield of salt was 24 parts. This salt was heated with an equal weight of phenol for 1.5 hours at 160–165° C. The pressure was then reduced to 5 mm. and the heating continued for a period of six hours, the temperature being gradually raised to 230° C. The resulting resin, a polyamide containing an acetylenic linkage, was reddish brown in color and somewhat plastic at room temperature. It was soluble in ethanol and in the ethyl ether of ethylene glycol.

Example IV

*Polyamide from muconic acid and ethylenediamine*

A mixture of 7.1 parts of muconic acid HOOCCH=CH—CH=CHCOOH, and 3.3 parts of ethylenediamine was dissolved in 50 parts of hot water. Sufficient ethylenediamine was added to make the solution neutral to litmus. The crystalline diamine-dibasic acid salt which separated upon cooling was dissolved in an equal weight of phenol and heated for 1.5 hours at 200–210° C. The phenol was then removed by 20 minutes additional heating under reduced pressure. A reddish brown, hard resin was formed which softened at about 61° C. It was soluble in certain ethanol-benzene mixtures, in the ethyl ether of ethylene glycol, and in 10% aqueous sodium hydroxide.

Example V

*Polyamide from mixed dihydronaphthalenedicarboxylic acids and decamethylenediamine*

Sixty and five-tenths (60.5) parts of decamethylenediamine was heated with 77 parts of a mixture of 1,2- and 1,4-dihydronaphthalene-1,2- and 1,4-dicarboxylic acids for 2.25 hours at 220–225° C. A soft plastic resin was obtained which was soluble in ethanol. Films of the resin upon baking for two hours at 100° C. were clear, amber-colored, and hard. The resin showed good adhesion to glass. The addition of a small amount of cobalt drier improved the film-forming qualities of the resin.

Example VI

*Polyamide from decamethylenediamine and 1,4-dihydronaphthalene-1,4-dicarboxylic acid*

Eleven (11) parts of decamethylenediamine was heated for one hour at 200–225° C. with 14 parts of 1,4-dihydronaphthalene-1,4-dicarboxylic acid,

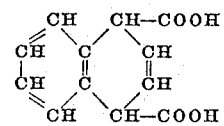

The resultant polyamide was a clear, amber-colored, hard, brittle resin. It softened at about 57° C. and was soluble in ethanol, dioxan, and in the ethyl ether of ethylene glycol.

Example VII

*Polyamide from hexamethylenediamine and dihydromuconic acid*

A solution of 12.5 parts of hexamethylenediamine in 100 parts of ethanol was added to a solution of 14.4 parts of dihydromuconic acid (HOOCCH₂CH=CHCH₂COOH) in 250 parts of hot ethanol. The diamine-dibasic acid salt which separated out melted at 189–191° C. A solution of 23 parts of the salt in 25 parts of mixed cresols was heated for five hours by means of the vapors of boiling naphthalene. The cresol was then removed under reduced pressure at 180° C. The residue (polyamide) thus obtained was an amber-colored, alcohol-soluble, resin which softened at about 35° C.

It will be noted from the examples that the polyamides of this invention can be prepared in the presence or absence of a solvent. Especially useful solvents in the preparation of the polyamides are monohydric phenols, such as phenol itself, the cresols, xylenols, hydroxydiphenyls, and the like. However, nonsolvents for the polymer, such as high-boiling hydrocarbons, may also be used. When easily volatile reactants are used, e. g., ethylenediamine, it is desirable to carry out at least the initial stage of the reaction in a closed reactor or under reflux to prevent loss of reactants. The products of this invention are conveniently prepared in an open reactor equipped with a reflux condenser which permits the water or other by-products of the reaction to escape but not the reactants or solvent. During the latter stage of the reaction it is often advantageous to decrease the pressure in order to complete the reaction and, if desired, to distill off the solvent. However, the product can be removed from the solvent by precipitation methods.

The polyamides of this invention are prepared by reacting the diamine and dibasic acid in substantially equal molecular proportions. This is necessary in order to obtain highly polymeric, water-insoluble products. It is possible, however, to obtain water-insoluble polymeric products suitable for use in coating and molding compositions by using as much as 10% excess of either reactant.

The examples cite a number of polyamides derived from the reaction of various unsaturated dicarboxylic acids with various diamines. As examples of other unsaturated acids that may be used in the preparation of the unsaturated polyamides of this invention might be mentioned mesaconic acid, itaconic acid, glutaconic acid, and glutinic acid. When a readily polymerizable acid is used, the polyamide is often contaminated with some of the acid polymers (Example V). In certain cases some addition of the diamine to the unsaturated linkage in the dibasic acid also occurs. Additional examples of diamines which may be reacted with the unsaturated dibasic carboxylic acids are tetramethylenediamine, pentamethylenediamine, heptamethylenediamine, octamethylenediamine, nonamethylenediamine, and p-xylylenediamine. Unsaturated diamines may also be used.

The polyamides in the foregoing examples are derived from unsaturated dibasic carboxylic acids and saturated diamines. Unsaturated polyamides are also obtained by reacting unsaturated diamines, e. g., $NH_2-CH_2-CH=CH-CH_2-NH_2$, $NH_2-CH_2-CH=CH-(CH_2)_2-CH=CH-CH_2-NH_2$ and $NH_2-CH_2-CH_2-CH_2-CH=CH-CH_2-CH_2-NH_2$ with dicarboxylic acids or amide-forming derivatives of dibasic carboxylic acids, such as dibutyl carbonate, diethyl oxalate, malonic acid, glutaric acid, adipic acid, pimelic acid, suberic acid, azelaic acid, sebacic acid, and p-phenylenediacetic acid.

It is evident from the above discussion that many combinations of reactants are possible in the preparation of the polyamides of this invention. Further combinations are possible by reacting one or more diamines with one or more dibasic carboxylic acids, at least one of which contains an unsaturated non-benzenoid linkage. Similarly, interpolymers can be prepared from the reaction of one or more monoaminomonocarboxylic acids with diamine-dibasic carboxylic acid mixtures, in which one reactant contains an unsaturated linkage. Moreover, it is within the scope of this invention to mix preformed polyamides, at least one of which contains an unsaturated non-benzenoid linkage. The products of this invention can be mixed with other polymers, e. g., superpolyamides of the types described in the applications previously referred to. Thus it is possible to add substantial amounts of an unsaturated polyamide to a superpolyamide, e. g., polyhexamethylene adipamide, and obtain a product whose properties closely resemble those of the unmodified superpolyamide; the mixed polymer can be spun from melt into filaments capable of being cold-drawn into oriented fibers.

The polyamides of the present invention which are derived from polyamide-forming reactants containing an unsaturated carbon-carbon non-benzenoid linkage are generally resinous condensation products. These products, at least when first prepared, are distinguished from those described in the above mentioned applications in that the polyamides claimed herein are soluble in quite a range of solvents and are therefore more adapted to the preparation of coating, impregnating, sizing, adhesive and molding compositions than those prepared from polyamides which do not contain the unsaturated linkage. The products may also be used in the preparation of fibers, but for this purpose it is generally desirable to incorporate them with a fiber-forming ingredient, such as a cellulose derivative or a fiber-forming superpolymer of the type described in the applications identified above.

The products of this invention, as indicated above, are for the most part resinous, varying in softening temperature and solubility characteristics, depending upon the reactants from which they were prepared. In general they are soluble in such solvents as alcohol, dioxan, and ethers of ethylene glycol. They are insoluble in water. For the most part they have good compatibility characteristics and can be mixed with drying oils, various resins, cellulose derivatives, plasticizers, and other ingredients which are used in the preparation of coating and plastic compositions. Many of the products are of the heat-hardening type, i. e., they can be converted by heating or sometimes by contact with air into insoluble products.

As many apparently widely different embodiments of this invention may be made without departing from the spirit and scope thereof, it is to be understood that I do not limit myself to the specific embodiments thereof except as defined in the appended claims.

I claim:

1. The polymeric reaction product of compounds consisting substantially solely of equimolecular proportions of bifunctional polyamide-forming reactants the sum of whose radical lengths is at least 9, the amide-forming groups in said reactants being attached to aliphatic carbon atoms, at least one of said reactants containing an unsaturated carbon-carbon linkage of the non-benzenoid type in the chain separating the amide-forming group.

2. A polyamide consisting substantially solely of the reaction product of one or more bifunctional reactants the sum of whose radical lengths is at least 9 and which provide substantially equimolecular proportions of interacting amide-forming carboxyl and amino groups, said amino groups being attached to aliphatic carbon atoms and having at least one hydrogen atom attached to each nitrogen atom, the amide-forming groups in at least one of said reactants being separated by an intermediate hydrocarbon radical containing an unsaturated carbon-carbon non-benzenoid linkage in the chain separating the amide-forming groups.

3. A polyamide obtainable by condensation polymerization from reactants consisting substantially solely of chemically equivalent amounts of a dibasic carboxylic acid and a diamine in which the amino nitrogens are attached to aliphatic carbon atoms and each carry at least one hydrogen atom, said dibasic carboxylic acid having an unsaturated carbon-carbon non-benzenoid linkage in the chain of atoms separating the carbonyl groups, said diamine and dibasic carboxylic acid being selected such that the sum of their radical lengths is at least 9.

4. A polyamide obtainable by condensation polymerization from reactants consisting substantially solely of chemically equivalent amounts of a dibasic carboxylic acid and a diamine in which the amino nitrogens are attached to aliphatic carbon atoms and each carry at least one hydrogen atom, said diamine having an unsaturated carbon-carbon non-benzenoid linkage in the chain of atoms separating the amino groups, said diamine and dibasic carboxylic acid being selected such that the sum of their radical lengths is at least 9.

5. A polyamide having its nitrogen atoms attached to aliphatic carbon atoms and derived substantially solely from a monoaminomonocarboxylic acid having a radical length of at least 9 and containing a hydrocarbon radical having an unsaturated carbon-carbon non-benzenoid linkage in the chain making up the recurring structural unit of the polyamide.

6. A process which comprises heating under polyamide-forming conditions reactants consisting substantially solely of chemically equivalent amounts of bifunctional polyamide-forming reactants the sum of whose radical lengths is at least 9 and one of which contains an unsaturated carbon-carbon non-benzenoid linkage in the chain separating the amide-forming groups, the amide-forming groups in said reactants being attached to aliphatic carbon atoms.

7. A process for making polyamides which comprises heating under polyamide-forming conditions reactants consisting substantially solely of chemically equivalent amounts of bifunctional polyamide-forming reactants the sum of whose radical lengths is at least 9, said reactants being a dibasic carboxylic acid and a diamine in which the amino nitrogens are attached to aliphatic carbon atoms and each carry at least one hydrogen atom, at least one of said reactants containing an unsaturated carbon-carbon non-benzenoid linkage in the chain of atoms separating the amide-forming groups.

8. A process for making polyamides which comprises heating until resinification takes place a monoaminomonocarboxylic acid as a substantially sole reactant, said acid having its amide-forming groups attached to aliphatic carbon atoms and having a radical length of at least 9 and containing a hydrocarbon radical having an unsaturated carbon-carbon non-benzenoid linkage in the chain separating the amide-forming groups.

9. A polyamide consisting substantially solely of recurring structural units of chain length of at least 9, said units having the general formula

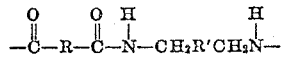

in which R and R' are divalent hydrocarbon radicals at least one of which contains an unsaturated carbon-carbon non-benzenoid linkage in the chain making up the recurring structural units.

10. A polyamide consisting substantially solely of recurring structural units having a radical length of at least 9 and having the general formula

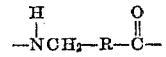

in which R is a divalent hydrocarbon radical containing an unsaturated carbon-carbon linkage of the non-benzenoid type in the chain making up the recurring structural units.

11. A polyamide consisting substantially solely of the reaction product of chemically equivalent amounts of bifunctional polyamide-forming reactants and having its nitrogen atoms attached to aliphatic carbon atoms and having a radical length of at least 9, said polyamide yielding on hydrolysis with strong mineral acids a polyamide-forming reactant of formula XRY in which X and Y represent amide-forming groups and R represents a divalent hydrocarbon radical containing an unsaturated non-benzenoid linkage in the chain making up the recurring unit of the polyamide.

12. The polyamide set forth in claim 3 in which said dibasic acid is maleic acid.

13. The polyamide set forth in claim 3 in which said dibasic acid is dihydronaphthalene dicarboxylic acid.

WALLACE HUME CAROTHERS.